United States Patent
Mitchell et al.

(10) Patent No.: US 9,672,496 B2
(45) Date of Patent: Jun. 6, 2017

(54) COMPUTER-VISION CONTENT DETECTION FOR CONNECTING OBJECTS IN MEDIA TO USERS

(75) Inventors: Justin Mitchell, Palo Alto, CA (US); Samuel Odio, Portola Valley, CA (US); David Harry Garcia, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 902 days.

(21) Appl. No.: 13/212,344

(22) Filed: Aug. 18, 2011

(65) Prior Publication Data

US 2013/0046823 A1 Feb. 21, 2013

(51) Int. Cl.
*G06F 15/16* (2006.01)
*G06Q 10/10* (2012.01)
*G06Q 30/02* (2012.01)

(52) U.S. Cl.
CPC ....... *G06Q 10/107* (2013.01); *G06Q 30/0269* (2013.01)

(58) Field of Classification Search
None
See application file for complete search history.

(56) References Cited

U.S. PATENT DOCUMENTS

| | | | |
|---|---|---|---|
| 8,423,109 B2 | 4/2013 | Baker | |
| 8,423,409 B2 | 4/2013 | Rao | |
| 8,554,627 B2 | 10/2013 | Svendsen | |
| 8,660,355 B2* | 2/2014 | Rodriguez et al. | 382/181 |
| 2009/0048921 A1 | 2/2009 | Tokuda | |
| 2009/0119165 A1 | 5/2009 | Cotgreave | |
| 2010/0030740 A1* | 2/2010 | Higgins | G06F 17/30241 715/762 |
| 2010/0046842 A1* | 2/2010 | Conwell | 382/218 |
| 2010/0076851 A1 | 3/2010 | Jewell, Jr. | |
| 2010/0088182 A1 | 4/2010 | Ryder | |
| 2011/0052012 A1 | 3/2011 | Bambha | |
| 2011/0244919 A1* | 10/2011 | Aller et al. | 455/556.1 |
| 2011/0283236 A1 | 11/2011 | Beaumier | |
| 2012/0005224 A1* | 1/2012 | Ahrens et al. | 707/769 |
| 2012/0041825 A1* | 2/2012 | Kasargod et al. | 705/14.68 |
| 2012/0238254 A1 | 9/2012 | Yankovich | |
| 2012/0239506 A1 | 9/2012 | Saunders | |

OTHER PUBLICATIONS

Mark R. Robertson, "The First Contextual Ad Platform to Leverage Image & Video Recognition Technologies Launched Today," archived by web.archive.org on Jul. 28, 2009, from website www.reelseo.com, Oct. 13, 2008.
Business Insider, "How to Stop Facebook from Using Your Name and Photo in Ads", Mar. 21, 2011.
Office Action for U.S. Appl. No. 13/212,356, May 13, 2013.

(Continued)

*Primary Examiner* — Quang N Nguyen
(74) *Attorney, Agent, or Firm* — Baker Botts L.L.P.

(57) ABSTRACT

Methods, apparatuses and systems directed to detecting objects in user-uploaded multimedia such as photos and videos, determining the location at which the media was captured, inferring a set of users of a social network who were physically present at the time and place of capture, and pushing remarketing content to the set of inferred users for the detected objects, or alternatively, the competitors of the detected concepts.

20 Claims, 7 Drawing Sheets

(56) References Cited

OTHER PUBLICATIONS

Final Office Action for U.S. Appl. No. 13/212,356, Oct. 10, 2013.
Office Action for U.S. Appl. No. 13/212,356, Apr. 18, 2014.
Final Office Action for U.S. Appl. No. 13/212,356, Oct. 14, 2014.
Office Action for U.S. Appl. No. 13/212,356, Jan. 28, 2015.

* cited by examiner

COMPUTER-VISION CONTENT DETECTION FOR CONNECTING OBJECTS IN MEDIA TO USERS

TECHNICAL FIELD

The present disclosure relates generally to social networking systems and other systems in which users can form connections with other users, and in particular, applying computer vision algorithms to user-uploaded multimedia objects to link detected concepts to real-world actions.

This disclosure hereby incorporates by reference commonly-owned U.S. utility patent application, U.S. patent application Ser. No. 13/020,745 entitled, "Sponsored Stories Unit Creation from Organic Activity Stream," previously filed on 3 Feb. 2011.

This disclosure hereby incorporates by reference commonly-owned U.S. utility patent application, U.S. patent application Ser. No. 13/152,576 entitled, "Computer-Vision-Assisted Location Check-In", filed on 3 Jun. 2011.

BACKGROUND

Social networks, or social utilities that track and enable connections between users (including people, businesses, and other entities), have become prevalent in recent years. In particular, social networking systems allow users to communicate information more efficiently. For example, a user may post contact information, background information, job information, hobbies, or other user-specific data to a location associated with the user on a social networking system. Other users can then review the posted data by browsing user profiles or searching for profiles including specific data. Social networking systems also allow users to associate themselves with other users, thus creating a web of connections among the users of social networking system. These connections among the users can be leveraged by the website to offer more relevant information to each user in view of the users' own stated interests in their connections.

A system, such as a website, that allows users to interact with the system typically stores a record for each users of the system. These records may comprise information provided by the user as well as information gathered by the system related to activities or actions of the user on the system. For example, a system may require a user to enter information such as contact information, gender, preferences, interests, and the like in an initial interaction with the system, which is stored in the user's record. A user's activities on the system, such as frequency of access of particular information on the system, also provide information that can be stored in the user's record. The system may then use information provided by the user and information gathered about the user, to customize interactions of the system with the user. For example, a website selling books may keep track of a users previous purchases and provide the user with information on related books during subsequent interactions with the system. Information in a user's profile may also be used by the system to target sponsored stories that are of interest to the user. Using information collected from and about users results in a system that is more efficient and beneficial for both the user and the system.

Traditional advertisements and sponsored stories require explicit, on-network interaction with a node in the social network, such as a check-in to a physical location, "liking" a hub page, commenting on a hub page, reviewing a product, and the like. A significant portion of off-network activity lacking explicit user interaction is captured in uploaded photos. Often implicit actions that occur off network, such as a user interacting with a brand at an event, may be captured in user uploaded photos. Once this association is generated, the objects may be pushed as remarketing content to other users who have explicitly attended the event but may not have experienced the brand.

Figure 1:
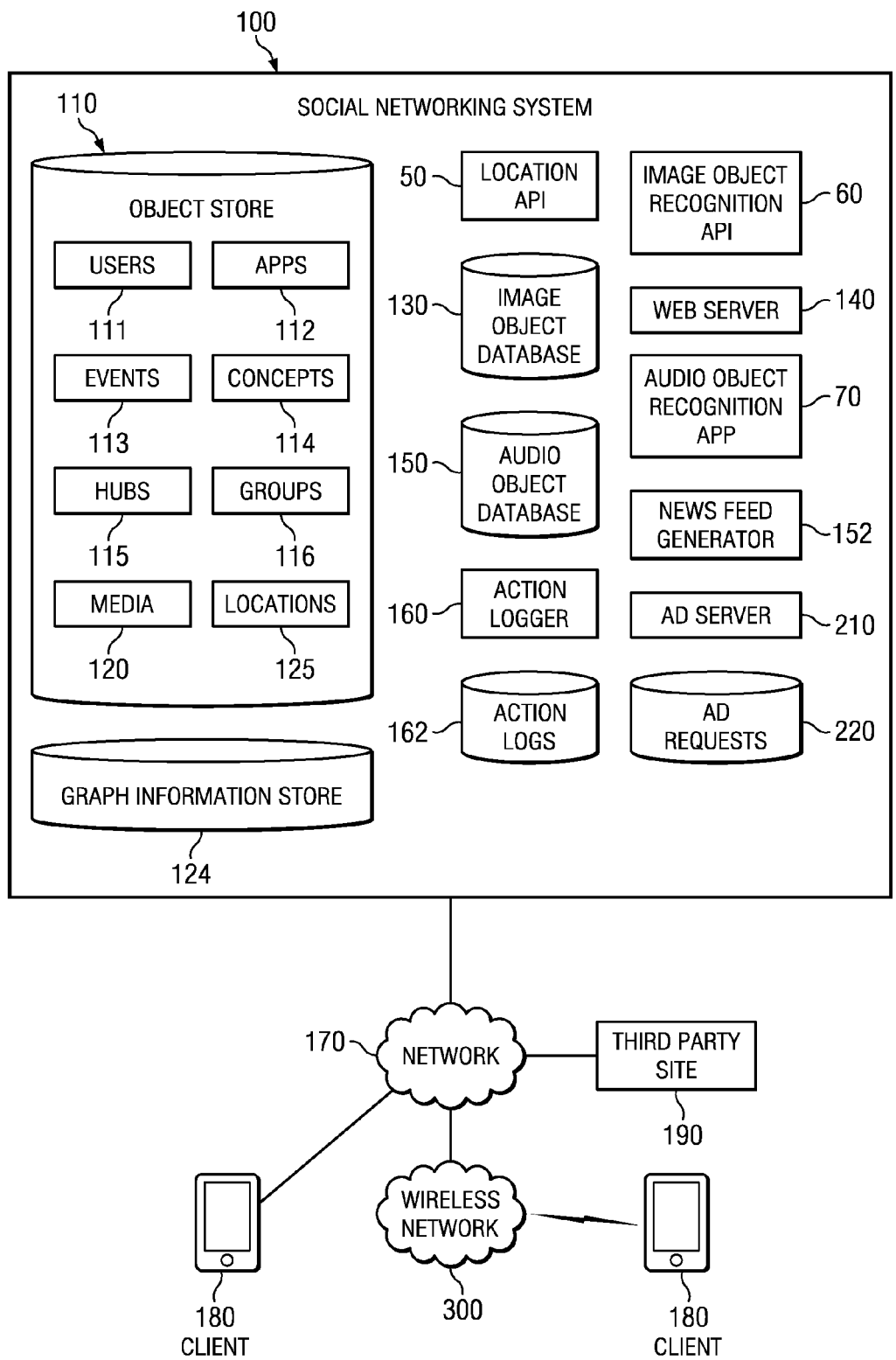
FIG. 1 illustrates an example computer network environment of an example social network.

The figures depict various embodiments of the present disclosure for purposes of illustration only. One skilled in the art will readily recognize from the following discussion that alternative embodiments of the structures and methods illustrated herein may be employed without departing from the principles of the invention described herein.

DETAILED DESCRIPTION OF EXAMPLE EMBODIMENT(S)

Overview

Particular embodiments relate to a social networking environment including a social networking system and related systems that integrate individual stories, status updates, and user interactions with an advertising system. In some implementations, the system detects exposure to various concepts (such as brands) based on media uploaded by users. A social networking system offers its users the ability to communicate and interact with other users of the social networking system. Users join the social networking system and then add connections to a number of other users to whom they desire to be connected. Once they are members of the social network, the users may interact with the social network itself, by posting stories and status messages on their own page, other users, by commenting, posting stories, etc. on other users' pages, or with non-user entities, such as fan pages that they subscribe to, online deals they redeem or subscribe to, or locations that they check in to. Additionally, users may upload multimedia objects, such as photos and videos, to the social networking system to share with other users of the social network. Users may take explicit actions on a social network to associate a photo with another element the social network, such as uploading a photo or video to an event page, or tagging individuals in the multimedia object. However, a substantial amount of information regarding off-network actions is never explicitly converted into an on-network connection. For example, the location at which the photo or video was captured, or specific objects and brands within the multimedia object.

In the present disclosure, the social network environment may be described in terms of a social graph including social graph information. In particular embodiments, one or more computing systems of the social network environment implementing the social network environment include, store, or have access to a data structure that includes social graph information for use in implementing the social network environment described herein. The social network utilizes a social graph that includes nodes representing users and concepts in the social network environment as well as edges that define or represent connections between such nodes.

In particular embodiments, the social graph information includes a first set of user nodes that each correspond to a respective user, and a second set of concept nodes that each correspond to a respective concept. As used herein, a "user" may be an individual (human user), an entity (e.g., an enterprise, business, or third party application), or a group (e.g., of individuals or entities) that interacts or communicates with or over such a social network environment. As used herein, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a third party application, a celebrity, a person who is not a registered user, etc. In particular embodiments, each node has, represents, or is represented by, a corresponding web page ("profile page") hosted or accessible in the social network environment.

By way of example, a user node may have a corresponding user profile page in which the corresponding user can add content, make declarations, and otherwise express him or herself, while a concept node may have a corresponding concept profile page ("hub") in which a plurality of users can add content, make declarations, and express themselves, particularly in relation to the concept. In particular embodiments, the social graph information further includes a plurality of edges that each define or represent a connection between a corresponding pair of nodes in the social graph.

Implementations of the present disclosure extend these concepts by allowing owners of concept nodes, such as business owners, brand owners, or other advertisers, to market products detected in user-uploaded photos to inferred users, or users who have had a high probability of exposure to the product or brand. In particular, implementations of the present disclosure allow sponsors or advertisers to capture off-network behavior or interactions with their brand by applying computer-vision algorithms to user-uploaded multimedia objects, such as photographs and videos. In particular embodiments, the social networking system may provide analytics to brands and advertisers to provide a geographic "heat map" of real-world exposures of their product. For example, an advertiser may wish to see where his or her products are the most popular within a particular city, state, country, or globally. By tracking the appearance of concept nodes through user-uploaded media, the social networking system may provide robust geographical data relating to the popularity of a given product.

In particular embodiments, the social networking system may allow advertisers to track the real-world popularity of their competitors products. Thus, a particular brand owner or advertiser may easily track the exposure of their competitors in a scalable geographic "heat map."

In particular embodiments, the social networking system maintains a photographic object database of various objects. In particular embodiments, the images in the photographic object database are generated by the social network itself. In particular embodiments, the images are submitted by administrators of nodes associated with businesses, such as business owners. A particular business owner may submit a photo image of his or her storefront, for example. As another example, a particular sponsor may submit multiple photos or vector graphics of its logo, branding or product(s). In particular embodiments, the photographic location database is provided by a third-party such as Google images. In particular embodiments, the images may be uploaded and tagged by users of the social network. This disclosure contemplates any method of generating or obtaining the photographic object database.

In particular embodiments, photographs uploaded to the social networking system are subject to an image object recognition algorithm. The image object recognition algorithm compares the uploaded image to images stored in the photographic object database and searches for similar objects. Methods for object searching are well-known in the art, and may include frequency-domain image processing, filtering, wavelet analysis, feature extraction, learning-algorithms such as neural networks, texture recognition, and the like. This disclosure contemplates any type of computer vision algorithms for finding matching objects.

In particular embodiments, the social networking system maintains an audio object database of various audio waveforms. In particular embodiments, the audio waveforms are generated by the social network itself. In particular embodiments, the audio waveforms are submitted by administrators of concept nodes in the same manner as described above. In particular embodiments, the audio object database is pulled from third party databases, such as online music stores (iTunes, Amazon music store, Zune, Rhapsody, Google music store etc.). This disclosure contemplates any suitable manner of building the audio object database.

In particular embodiments, audio or video recordings are subject to an audio object recognition algorithm. The audio object recognition algorithm compares the uploaded audio waveform to audio waveforms stored in the audio object database for matching waveforms. Methods for audio matching are well-known in the art, and may include frequency domain audio processing, fast fourier transforms (FFT), waveform "fingerprinting", and the like. This disclosure contemplates any type of audio waveform matching algorithm for finding matching sounds.

In one example, a concept node owner or administrator may wish to remarket its product or brand by pushing content to "inferred users," users who are likely to have had exposure to a given product or brand off-network. For example, a user may upload a photo containing a Heineken beer product to an event page for a party. Although there is no explicit connection between Heineken beer and the party, the fact that the photo containing the Heineken beer to the event page for the party signals to the social network that Heineken was served at the party. Thus, the social network may infer that other users who attended the party were likely exposed to Heineken beer. Consequently, Heineken may choose to remarket their product to all the users who attended the party and were likely exposed to their brand, even without ever knowing of the party's existence. In particular embodiments, a concept node administrator may simply wish to see metrics on brand exposure. In particular embodiments, a concept node administrator may wish to see where his or her competitors products are the most highly exposed, and push advertisements to those locations and users.

In another example, an artist may wish to promote his or her music to inferred users who have likely been exposed to one or more of the artist's songs. A user may upload a video from a party containing music to the event page for the party. The social networking system extracts the audio from the video file, and searches a database of audio files for a matching audio waveform. If the uploaded audio matches one of the artist's songs, the video file is tagged with a link in the social graph to the concept node for the artist's song. By the same rationale as above, the social network infers that users who attended the event, by virtue of checking-in or RSVPing to the event, were also exposed to the song. Thus the artist may remarket his or her music to users who have likely been exposed to the song, even without knowledge of where or how they were exposed to the song.

In another example, no explicit link to a particular node is required. For example, if a user uploads a photo to his or her own personal photo gallery, but does not explicitly form an on-network association to a location or event to the photo, the social networking system may use image-recognition algorithms to determine the location from which the image was captured. Then, it may find other images captured at the same location in the same time or place, and push content to the users who uploaded the other images, or users who are tagged in the other images.

In particular embodiments, photos may be tagged with any entity or node, including brands, concept pages, locations, and objects. Thus, a brand administrator may seek to push marketing content to users associated with tagged nodes in a photo. For example, if a user uploads a photo to an event hub, and another photo uploaded to the event hub includes tags for various non-user nodes (e.g., "Red Bull" or a particular venue), the social networking system may extend the delivery of marketing content one degree of separation, and push content to user nodes associated to the tagged non-user nodes.

Various portions of such a social networking platform may be implemented via a hardware architecture or software framework that enables various software components or processes to implement particular embodiments, as is described in more detail, by way of example and not by way of limitation, below. The platform may include one or more hardware or software components, one or more of which may be located or embodied in one or more consolidated or distributed computing systems. Additionally, as used herein, "or" may imply "and" as well as "or;" that is, "or" does not necessarily preclude "and," unless explicitly stated or implicitly implied.

FIG. 1 is a high-level block diagram of a social networking system including an image-based object determination system according to one embodiment. FIG. 1 illustrates a social networking system 100, client devices 180, wireless cellular network 300, and third-party website 190. It is understood that wireless cellular network 300 represents multiple wireless cellular networks provided by a plurality of carriers. Client device 180 is depicted as a mobile phone, but client device 180 may comprise any type of computing device, including mobile phone, laptop, netbook tablet, cable box, television, etc. Client device 180 is any device with both a data connection to network 170 and a camera. Client device 180 need not have a direct connection to network 170 or wireless data network 300. For example, client device 180 may be a digital camera with a Bluetooth connection to a modem. Client device 180 has one or more memories capable of storing captured multimedia objects such as photos, videos, and audio files.

Social networking system 100 comprises a computing system that allows members to communicate or otherwise interact with each other and access content as described herein. Social networking system 100 stores member profiles that describe the members of a social network, including biographic, demographic, and other types of descriptive information, such as work experience, educational history, hobbies or preferences, location, and the like. Social networking system 100 may be a website that further stores data describing one or more relationships between different members. The relationship information may indicate members who have similar or common work experience, group memberships, hobbies, or educational history.

A user of the client device 180 interacts with the social networking system 100 via an application, such as a web browser or a native application, to perform operations such as browsing content, posting and sending messages, retrieving and sorting messages received from other users, uploading multimedia objects, and the like. Client device 180 may also use an application or browser to pull and view profile information for various user nodes and hubs in social networking system 100.

Social networking system 100 comprises an object store 110, and a graph information store 124. The object store 110 stores information on objects, such as users, represented in or by the social networking environment 100. The graph information store 124 stores information on the relationships of the objects in the object store 110.

Object store 110 includes various storage areas. User store 111 includes profile pages for specific user accounts or members of social networking system 100. Hubs store 115 includes profile or hub pages for concept nodes such as businesses, locations, and celebrities. Apps store 112 includes third-party applications that users may install and run on their profile page. Media store 116 includes uploaded user media such as photos, videos, audio files, and other types of multimedia objects.

Image object database 130 stores information regarding physical real-world objects or logos, that may be associated with concept nodes, such as brand, product, or company. Image object database 130 may also include multiple images associated with real-world physical locations. Image object database 130 is communicatively coupled to hubs store 115, concepts store 114, events store 113, and locations store 125.

In one implementation, each object can be maintained as a node in a social graph or other data structure maintained by the social networking system. Social networking system 100 may allow users to access information regarding each object using a client application (e.g., a browser) hosted by a wired or wireless station, such as a laptop, desktop or mobile device. For example, social networking system may serve web pages (or other structured documents) to users that request information about an object. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users.

In particular embodiments, social networking system 100 may also include an audio object database 150. Audio object database 150 includes audio waveforms for a plurality of audio objects, such as music or video files. For example, audio object database 150 may include every song of a particular artist for matching to detected ambient audio via audio object recognition application 70. In particular embodiments, audio object database 150 also includes the audio to video media, such as for TV shows or movies. Thus, if a user uploads a video from a party where a particular TV show or movie is playing in the background, it may be matched with the correct TV show or movie in audio object database 150.

Location application program interface (API) 50, audio object recognition application 70, and image object recognition API 60 interacts with client device 180 to receive photos and other multimedia objects. In particular embodiments, client device 180 may upload photos substantially in real-time and without user action. In particular embodiments, client device 180 only uploads the photo in response to specific user actions. In particular embodiments, client device 180 uploads the photo or multimedia device through wireless network 300. In particular embodiments, client device 180 has a wired or wireless connection, such as a cellular connection or WiFi connection, and uploads the photo or multimedia object directly through network 170. This disclosure contemplates any manner of connectivity from client device 180 to social networking system 100.

Image object recognition API 60 accesses photographic object database 130. Photographic object database 130 contains a collection of images of logos, products, brands, and the like. In particular embodiments, photographic object database 130 includes, for each photo, an association with a particular concept node stored in concept store 114. In particular embodiments, searchable text extracted through OCR is stored in association with photo images containing signage or other sources of text. For example, photographic object database 130 may store the text "Coca-Cola" in a searchable format in association with a photo of a Coca-Cola product. In particular embodiments, photographic object database 130 stores a link to the node associated with the object, and pulls text or other related data directly from the node as necessary.

Photographic object database 130 may be updated to keep the photographs current. In particular embodiments, photos and videos received from other users may be utilized to update photographic object database 130. In particular embodiments, location image object recognition API 60 may pull images from third-party sites 190 such as Yelp! or Google Images to update photographic object database 130.

Additionally, social networking system 100 includes a web server 140, an action logger 160, an action log 162, a newsfeed generator 152, an ad server 210, and a database of ad requests 220. In other embodiments, social networking system 100 may include additional, fewer, or different modules for various applications.

Web server 140 links social networking system 100 via network 170 to one or more client devices 180, as well as to one or more third party websites 190. Web server 140 may include a mail server or other messaging functionality for receiving and routing messages between social networking system 100 and client devices 180 or third party websites 190. The messages can be instant messages, queued messages (e.g., email), text and SMS messages, or any other suitable messaging technique.

Action logger 160 is capable of receiving communications from the web server 140 about member actions on or off social networking system 100. Newsfeed generator 150 generates communications for each member about information that may be relevant to the member. These communications may take the form of stories, each story is an information message comprising one or a few lines of information about an action in the action log that is relevant to the particular member. The stories are presented to a member via one or more pages of the social networking system 100, for example in each member's home page or newsfeed page.

Ad server 210 performs an ad selection algorithm. Ad server 210 is communicatively coupled to the database of ad requests 220 and to action log 230 for this purpose.

Figure 2:
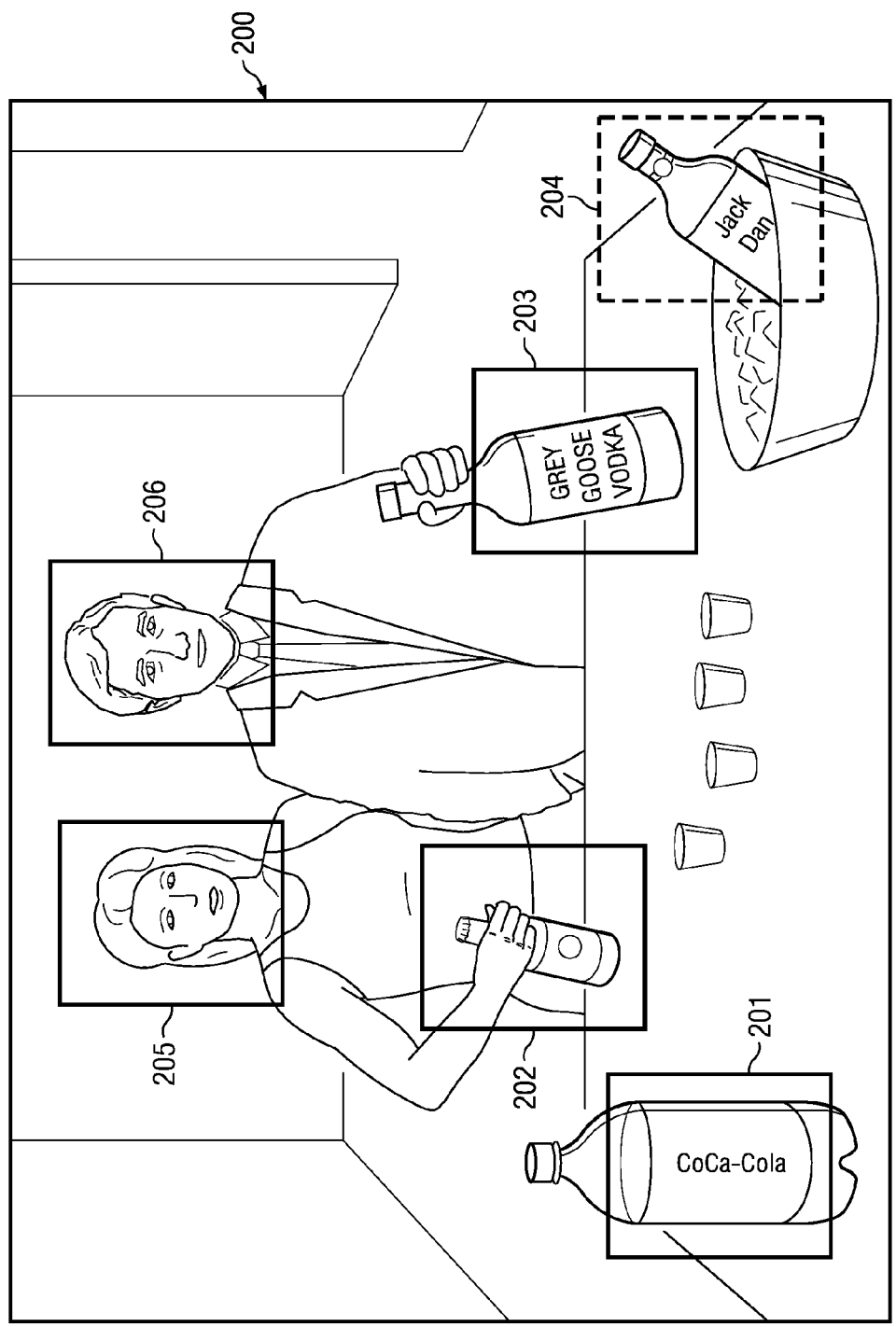
FIG. 2 is an example portion of a social graph depicting one arrangement where remarketing to inferred users in accordance to one embodiment of the invention may be utilized.

FIG. 2 illustrates an example user-uploaded image 200. Image 200 includes, for didactic purposes, faces 205 and 206, and various objects 201-204 that may be recognized by image object recognition API 60 upon reception by social networking system 100. Image object 201, in this case, a bottle of "Coca-Cola", may be detected through optical character recognition or other computer vision techniques. Similarly image object recognition API 60 may detect the beverage 202 through comparison of the logo with a number of saved logos in photographic object database 130. Although the example image 200 includes 4 types of product labels this disclosure contemplates detecting any type of image object, such as signage in the background of photos, cars, famous buildings, and the like. For example, object image recognition algorithm may recognize the make and model of a vehicle in a picture of a person sitting in his or her new car, and tag the image accordingly. Similarly, image object recognition API 60 may detect signage at corporate-sponsored events. This disclosure contemplates any type of object recognition.

Figure 3:
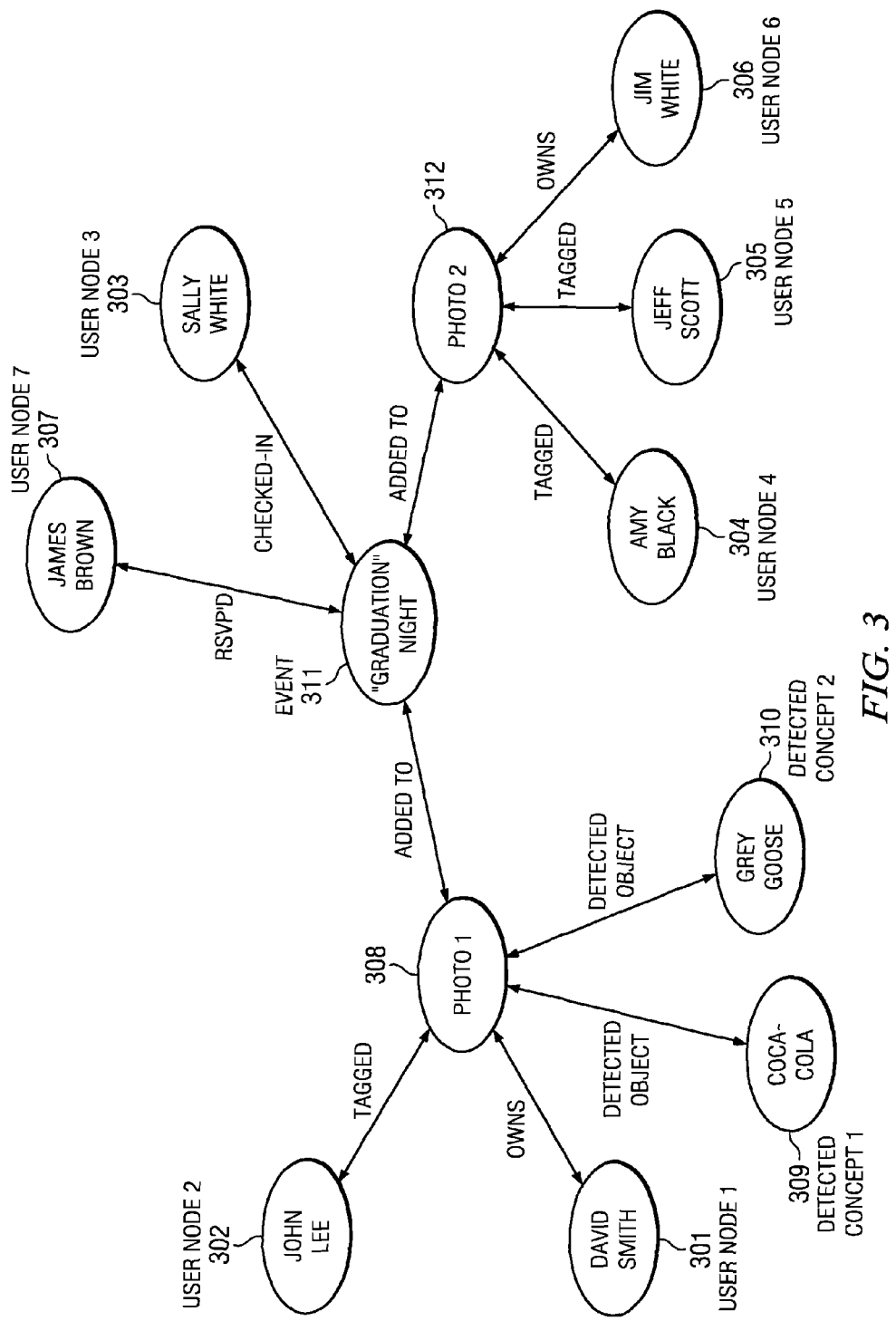
FIG. 3 is an example portion of a social graph depicting an arrangement for remarketing detected audio objects to inferred users.

FIG. 3 illustrates, for didactic purposes, an example portion of a social graph for remarketing a detected product to inferred users. A user, "David Smith", represented in the social graph by user node 301, uploads photo 308 to the hub page for event 311 ("Graduation Night"). In the social graph, an "ownership" edge connects user node 301 to photo 308, and an "added to" edge connects photo 308 with event 311. Photo 308 is displayed on the social network on the wall or photo gallery for event 311. For didactic purposes, photo 308 corresponds to image 200 in FIG. 2. The edge types described here are for didactic purposes only; this disclosure contemplates any manner of storing information in edges connecting nodes in a social graph.

Figure 6:
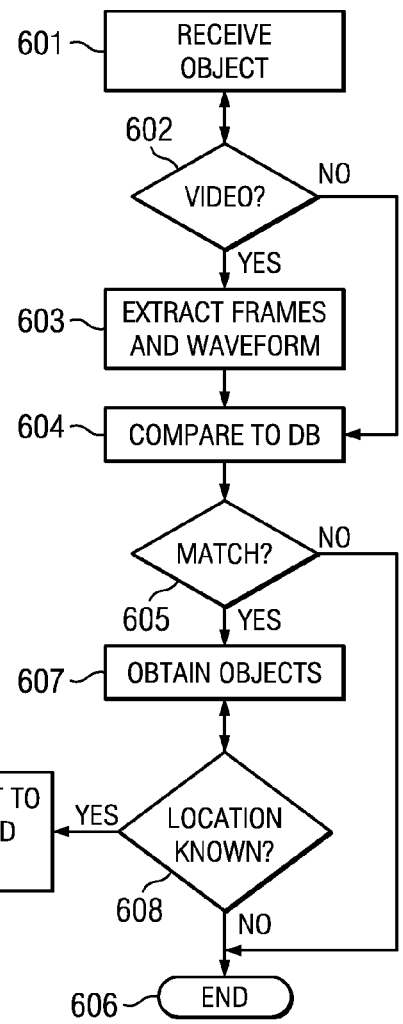
FIG. 6 is a flowchart of an example method of remarketing detected objects to inferred users according to one embodiment.

Through image object recognition described in greater detail with respect to FIG. 6, social networking system 100 detects two objects associated concept nodes in image 200, Coke bottle 201 and Grey Goose bottle 204. Photo 308 is subsequently connected by "detected object" edges to concept nodes 309 and 310 representing "Coca-Cola" and "Grey Goose," respectively. In particular embodiments, photo 308 may include explicit user tags linking it to other users, such as user 302 ("John Lee"). In particular embodiments, social networking system 100 may push remarketing content to users explicitly exposed to products, such as user 302, as well as inferred users.

User nodes 304-307 all represent inferred users in accordance with particular embodiments of the invention. User nodes 304-307 have inferred connections to concept nodes 309 and 310 (not shown) because social networking system 100 ascertains that there is a high likelihood that users 304-307 were exposed to the brands represented by concept nodes 309 and 310 by virtue of attending the same event 311. In particular embodiments, social networking system 100 may determine that a particular user attended an event through explicit, on-network actions. For example, user 307 ("James Brown") RSVPed to event 311 on social network 100, either through a web interface or client device 180. As another example, if a user checks into the location where an event is hosted during the listed hours of the event, such as user 303 ("Sally White"), social networking system designates the users as inferred users, and pushes promotional content or remarketing material related to concept nodes 309 and 310 to the inferred users.

Social networking system 100 may also determine that users attended an event through explicit photo tags. For example, user 306 ("Jim White") uploads photograph 312 to the hub page for event 311, and in the photo tags users 304 and 305. Because it is highly likely that the three users were exposed to brands represented by concept nodes 309 and 310, social networking system 100 considers them "inferred users" who will receive remarketing materials related to concept nodes 309 and 310. In particular embodiments, users 304-306 and 302 do not need to be explicitly tagged, and may be automatically tagged by a facial recognition algorithm. In particular embodiments, the auto tagger creates "invisible tags"; tags that link its best guess user to a photo based upon a facial recognition algorithm, but are not visible to any users.

In particular embodiments, inferred users are created for every detected object associated with a photo. For example, if photo 312 contained another detected object, for example, Sprite soda, users 301-303 and 307 would be considered inferred users for the concept node associated with Sprite soda.

Figure 4:
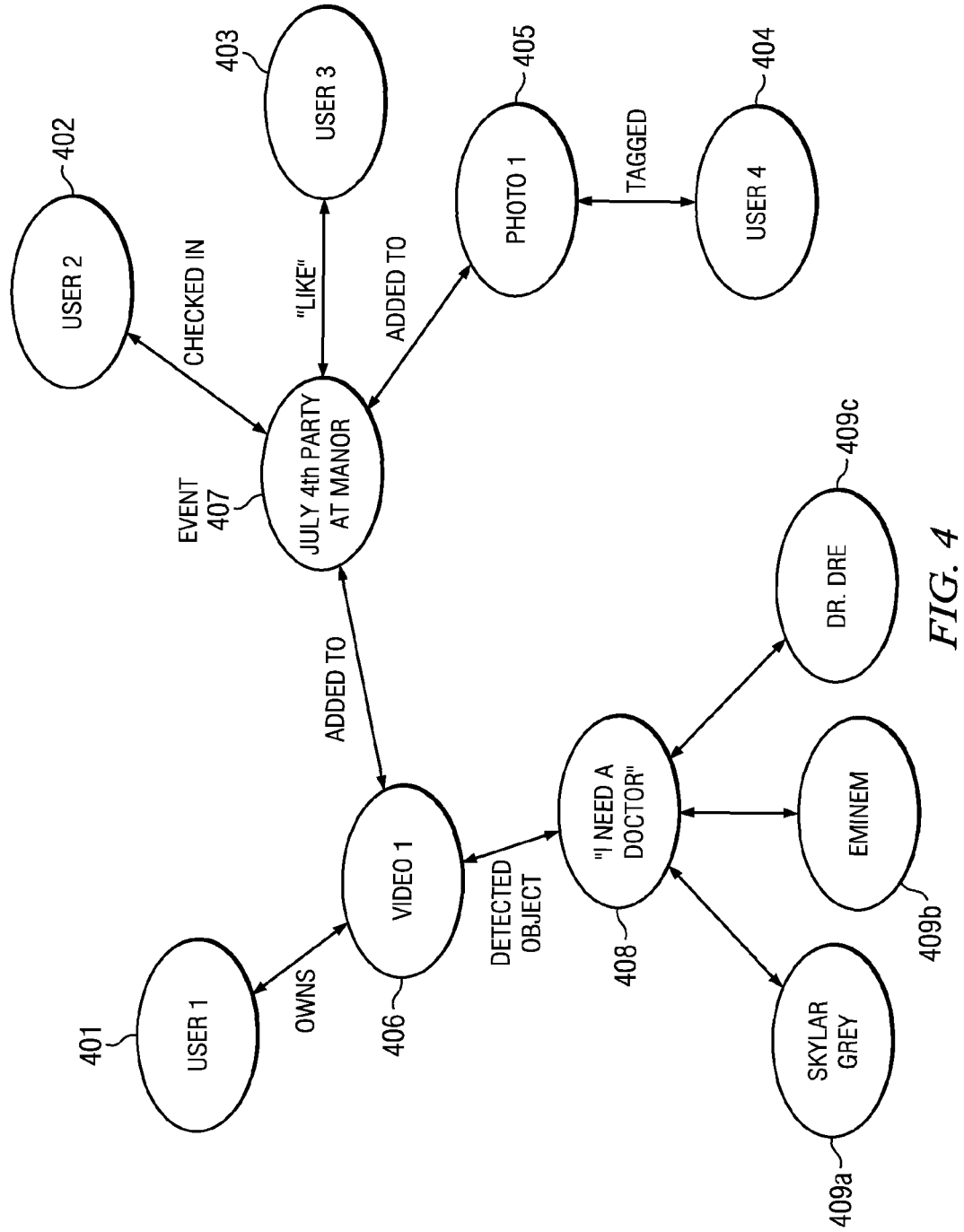
FIG. 4 is an example portion of a social graph depicting an arrangement for remarketing detected objects where no explicit location is defined.

FIG. 4 is an example portion of a social graph for remarketing a detected audio object to inferred users. For didactic purposes, FIG. 4 illustrates a single event 407, in this example, a party ("July 4th Party at Manor"). User 401 uploads a video 406 of the party to the party's event page on social networking system 100. Social networking system 100 extracts the audio from video 406, and via audio object recognition application 70, detects that a song 408 was played at the time the video was captured. The extraction and audio matching process of audio object recognition application is explained in greater detail with respect to FIG. 6 below.

In particular embodiments, social networking system 100 queries the social graph in graph information store 124 for other concept nodes connected to concept node 408 (representing the song "I Need a Doctor"). In particular embodiments, in response, social graph information store returns the artists of the song 409a, 409b, and 409c. In particular embodiments, other linked concept nodes may be returned, such as the album name, the genre, and other similar songs by the same artist. This disclosure contemplates returning any number and type of concept node in response to a query to the social graph for connected concept nodes.

Social networking system 100 determines that users 402, 403, and 404 are inferred users for concept node 408 in the same manner as in FIG. 3. Thus, social networking system may promote remarketing material, advertisements, suggested pages, etc. to users 402, 403, and 404 concept node 408, or any of concept nodes 409a-c.

Figure 5:
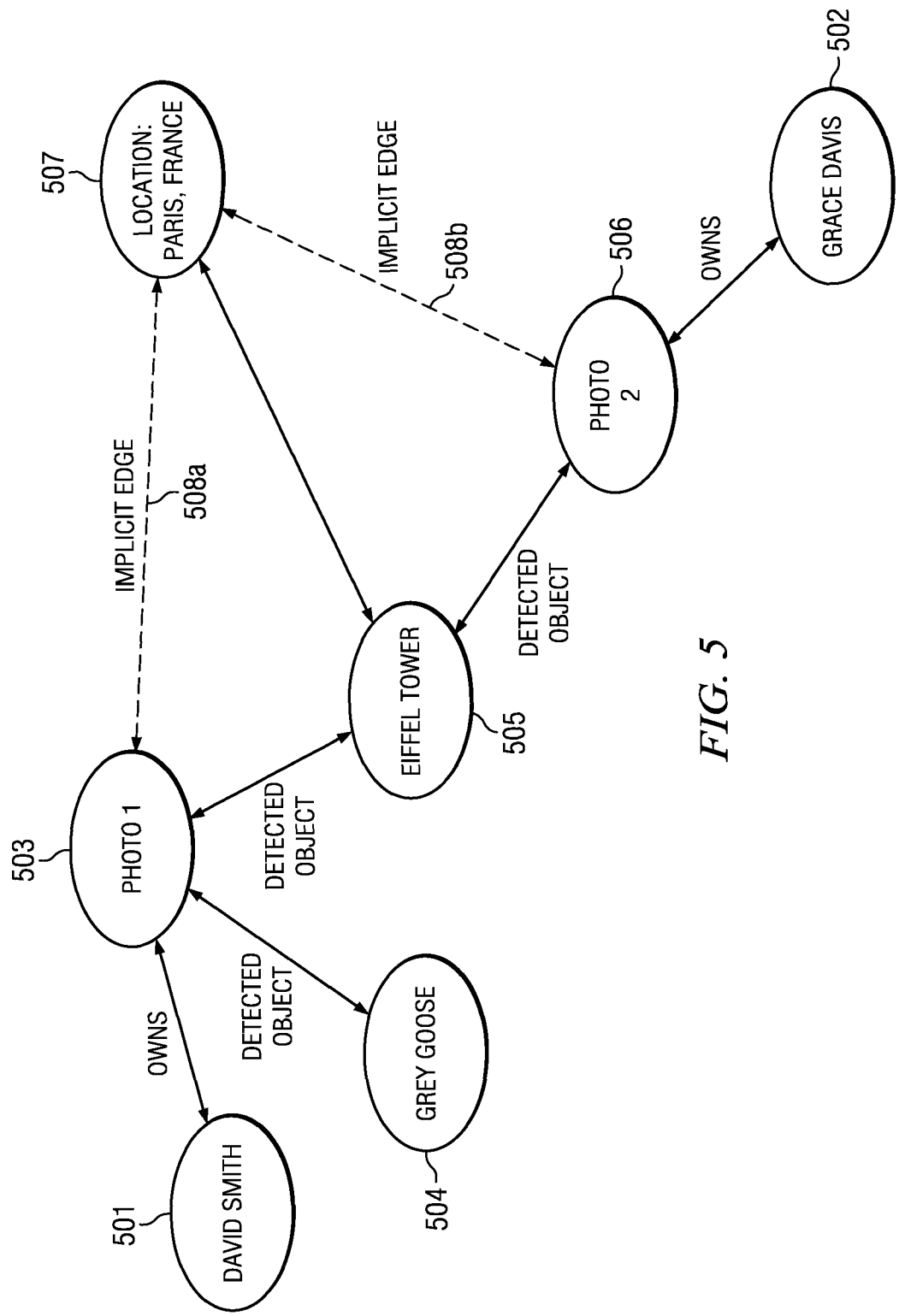
FIG. 5 depicts an example user-uploaded photograph and the detected objects contained therein.

FIG. 5 is an example portion of a social graph for remarketing a detected object to inferred users where no explicit location information is provided by any user. User 501 ("David Smith") uploads photo 503 to social networking system 100 to his own photos page. Thus, photo 503 lacks any explicit indication of where the image was captured. As will be further described in reference to FIG. 6, image object detection API 60 may detect well-known or recognizable objects, such as the Eiffel Tower 505. In FIG. 5, image object recognition application 60 detects two image objects associated with concept nodes, a product associated with concept node 504 ("Grey Goose"), and Eiffel Tower 505. Location API 50 may determine, with varying precision, the longitude and latitude coordinates from which photo 503 was captured, and append the location data to photo 503 explicitly, or as implicit edge 508a.

In FIG. 5, another user node 502 ("Grace Davis") uploads photo 506, also lacking any explicit location identifiers, to social networking system 100. Through the same image matching process as described above, image objection recognition algorithm 60, or alternatively or in conjunction with location API 50, may detect the Eiffel Tower in photograph 506. Consequently social networking system 100 connects photo 506 to the concept node for the Eiffel Tower 505.

Location API additionally appends a location to photo 506, either through explicit meta data, or through implicit edge 508b. In particular embodiments, social networking system 100 determines whether the two locations where photos 503 and 506 were captured are sufficiently close to infer that the users were in the same location. In particular embodiments, social networking system 100 relies on EXIF data to determine whether the two images were captured within a predetermined temporal duration from each other, such as 30 minutes. In particular embodiments, social networking system, in the absence of EXIF timestamp data, relies on the time of upload to determine whether two images were captured within a sufficiently close temporal duration. In particular embodiments, when social networking system determines that two photos were taken at the same time and place, they are both linked to the same location 507 by implicit edges 508a and 508b. In particular embodiments, the advertiser or concept node owner may specify how close two users must be in order to be treated as inferred users. For example, a node administrator may only require that two users be in the same city.

While the aforementioned examples describe explicit location information in terms of posting to event pages, check-ins, and RSVPs, this disclosure contemplates any manner of explicit location data. In particular embodiments, EXIF data including geo-tagging metadata from GPS or aGPS devices may be used as explicit location data. In particular embodiments, location API 50 may utilize natural language processing on the uploading user's album name or photo captions to guess the location of the photo in the absence of EXIF data or detectable landmarks.

When social networking system 100 determines that photos 503 and 506 were captured sufficiently close spatially and temporally to be considered in the same place and time, then social networking system 100 may consider user 502 an inferred user for detected concept node 504, and push remarketing material to user 502.

In any of the examples depicted in FIGS. 2-5, the pushing of marketing content is not necessarily by the detected brand, but rather the detected brand's competitor. For example, a concept node administrator for "Stoli vodka" may wish to push marketing content to users who have been explicitly exposed, or are likely to have been exposed, to "Grey Goose." Thus, the same methods as described above and with respect to FIG. 6 may be applied for delivery of Stoli marketing material to users who have been tagged with Grey Goose products in their photos, as well as inferred users who were likely exposed to Grey Goose at the same event.

FIG. 6 illustrates an example method of detecting image objects for remarketing and location determination. At Step 601, one or more servers of social networking system 100 running image object recognition API 60, alone or in conjunction with location API 50 and audio object recognition application 70, receives a multimedia object. The multimedia object may be uploaded from client device 180 through any type of packet data connection. In particular embodiments, the multimedia object is uploaded substantially in real-time automatically through the wireless data connection of client device 180. In particular embodiments, the multimedia object is uploaded in response to user inputs to client device 180. In particular embodiments, the multimedia object is uploaded in connection with a check-in. Regardless of when or how the multimedia object is uploaded, the method proceeds to step 602, where image object recognition API 60 determines whether the uploaded multimedia object is a photo or video.

If image object recognition API 60 determines that the uploaded multimedia object is a video, the method proceeds to Step 603. In Step 603, image object recognition API 60 extracts one or more individual frames from the video file along with the audio waveform from the video file. Image object recognition API 60 may extract frames from a video file in any manner. For example, in particular embodiments, image object recognition API 60 may select the first frame. In particular embodiments, location API may select the frame or frames which have the greatest similarity to other frames. In particular embodiments, image object recognition API 60 may select frames at predetermined intervals. This disclosure contemplates any manner of selecting and extracting frames from a video file.

Audio object recognition application 70 may be responsible for extracting the audio waveform from the uploaded video file. In particular embodiments, the entire waveform is not extracted, but only a portion in the time-domain. In particular embodiments, audio object recognition application 70 first performs waveform analysis to generate a waveform "DNA" or "fingerprint" uniquely characterizing the waveform. In particular embodiments, this is achieved through frequency domain processing, such as FFTs and wavelet transforms. Methods for extracting and generating waveform fingerprints are well-known in the art. This disclosure contemplates any manner of waveform analysis and processing.

After extracting one or more frames for comparison from the video file along with the audio waveform from the video file, or if the multimedia object is a single photographic image, the method proceeds to Step 604. At Step 604, image object recognition API 60 compares the uploaded photo or extracted frames to photographs in photographic object database 130. In particular embodiments, this process is carried out through specialized a object recognition application. In particular embodiments, this step is carried out by image object recognition API 60. In particular embodiments, one or more software modules for comparing textures, edges, smooth objects, and the like carry out Step 604. In particular embodiments, image object recognition API 60 performs frequency-domain image processing or texture recognition to match a particular object in the uploaded photo to an object in one of the photographs in photographic object database 130. In particular embodiments, image object recognition API 60 uses graph similarity functions to perform the image matching. In particular embodiments, image object recognition API 60 creates object representations based on two-dimensional shape primitives for each object in the uploaded photo, and compares the primitives to primitives stored in association with each photo in photographic object database 130. In particular embodiments, image object recognition API 60 creates a transformed image from the uploaded photo using wavelet transforms, and compares the image to wavelet transforms of images stored in photographic object database 130. In particular embodiments, image object recognition API 60 utilizes a neural network to classify objects in the uploaded image. Methods of image matching and image object recognition are well-known in the art, and this disclosure contemplates any suitable method for matching objects in the uploaded image with objects contained in the images stored in photographic object database 130.

Comparison Step 504 may include extracting text from the uploaded image or extracted frames. Image object recognition API 60 may include an optical character recognition application or other software modules that, alone or in conjunction, may locate blocks of text, perform OCR on the blocks of text, and extract searchable text from the OCR process. For example, the text on bottle 203 ("Grey Goose Vodka") may be searched and matched with a database of concept nodes or photographs with extracted text in photographic object database 130. Because of the relative speed at which text may be searched versus images, in particular embodiments, image object recognition API 60 first narrows the set of images in photographic location database 130 to be compared with the uploaded image to only those stored with extracted text matching a portion of the text extracted from the uploaded image.

Optionally at Step 604, extracted audio waveforms from the uploaded video or audio file are compared to waveforms in audio object database 150 by audio object recognition application 70. As previously discussed, waveforms may be compared via any number of audio waveform matching algorithms, such as matching waveform fingerprints generated through FFTs or other frequency-domain transforms.

If image object recognition API 60 and audio object recognition application 70 completes the search of all images in photographic location database 130, or all of the waveforms in audio object database 150, without a match, the process terminates at Step 606. In particular embodiments, image object recognition API 60 may progressively increase the search set until a match is found or every single image in photographic object database 130 is searched. If an object in the uploaded image, extracted frames, or extracted audio waveform matches an object contained in an image stored in photographic object database 130 or audio object database 150, at Step 607, image object recognition API 60 or audio object recognition application 70 obtains the concept node identifier stored in association with the matching image or waveform.

Upon obtaining the concept node identifiers associated with one or more photographs in photographic object database 130 containing objects matching objects in the uploaded photo, image object recognition API 60 tags the detected object in Step 608. Similarly, upon obtaining the concept node identifier associated with one or more audio waveforms in audio object database 150 matching the extracted audio from a multimedia object, audio object recognition application 70 tags the detected object in Step 608. Thus, in the example of FIG. 4, coca-cola bottle 401 would be tagged with the concept node for "Coca-Cola," vodka bottle 403 would be tagged with the concept node "Grey Goose", bottle 404 would be tagged with "Jack Daniel's", and so on. In particular embodiments, a single object may be tagged with multiple concept nodes. For example, bottle 404 may be tagged with "Jack Daniel's" as well as "Old No. 7", or "Gentleman Jack."

Once the image or audio objects have been tagged in the multimedia object in Step 607, then social networking system 100 determines whether the location of the multimedia object is known in Step 608. In particular embodiments, location determination is based on explicit location identifiers, such as a photo uploaded in conjunction with a check-in to a known location, or uploaded to an event page with a known location. In particular embodiments, explicit information may be read from EXIF data including GPS coordinates from the photo metatdata. In particular embodiments, social networking system 100 may extract location data by extracting album names or photo captions. In particular embodiments, location determination is based upon objects matched in Step 604.

In particular embodiments, a set of images in photographic object database 130 contains a location value. In particular embodiments, photographic object database 130 may be logically or physically linked to location database 117. Regardless of the particular implementation, photographic object database 130 contains a collection of photos of various places, landmarks, businesses, and other physical locations, and may include multiple photos for each location or place stored in location database 117. In particular embodiments, photographic object database 130 includes, for each photo, the longitude and latitude coordinates associated with the physical location in the photo. In particular embodiments, each photo in photographic object database 130 includes a direction vector indicating the viewpoint from which the photo was taken. In particular embodiments, searchable text extracted through OCR is stored in association with photo images containing signage or other sources of text. For example, photographic object database 130 may store the text "Hollywood" in a searchable format in association with a photo of the famous "HOLLYWOOD" sign in Los Angeles.

Thus, when an image object matches a particular image in photographic object database 130 that is associated with a physical-location, for example, the Eiffel Tower, social networking system 100, via location API 50, tags the photo with a real-world location. In particular embodiments, even if an image lacks an explicit location identifier, and cannot be matched with any objects in image object database 130, a location may still be inferred by comparing the uploaded photograph to all other users' uploaded photographs. For example, if User A uploads a photograph to his profile, but the photograph matches a photograph added to a particular event page, social networking system 100 may infer that User A's photo was taken at the same event.

If an image is uploaded with no explicit location indicators, and location API 50 is unable to determine a physical location by matching object in photographic object database 130 or other users' photos having a location, then the process terminates at Step 606.

However, if the location of the multimedia object is known, the process proceeds to Step 609, where social networking system 100 identifies inferred users and pushes remarketing material to them over a notification channel.

Figure 7:
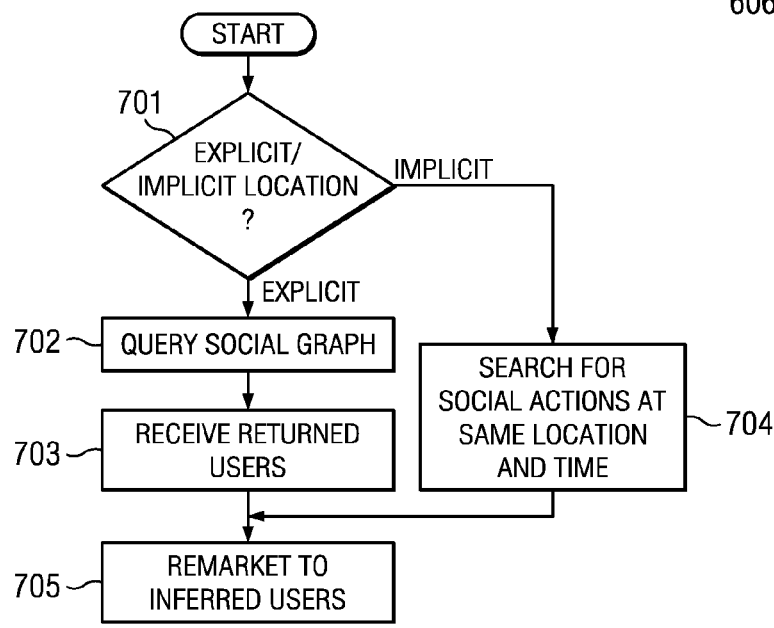
FIG. 7 is a flowchart of an example method of detecting inferred users according to one embodiment.

FIG. 7 illustrates the process of identifying inferred users and pushing remarking material to the inferred users of Step 609. The process begins at Step 701, where social networking system 100 determines whether the multimedia object's location was explicitly or implicitly identified. If the location of the multimedia object is explicitly identifies, social networking system 100 as Step 702 issues a query to the social graph maintained in social graph information store 124 for users who committed social actions on the explicitly defined location within a set time period. For example, if the multimedia object was uploaded in conjunction with a check in, the social networking system would look for other users who have checked-into that location within a preset temporal duration, users who have RSVP'd to events in the same location within a preset time period, or users who have been tagged in other multimedia objects associated with the explicitly defined location. As another example, if the multimedia object was uploaded to the wall of an event, social networking system 100 would issue a query to the social graph for all users who RSVP'd to the event, checked into the event, or was tagged in a photo uploaded to the event. This disclosure contemplates any suitable manner of identifying inferred users through both on-network and off-network social interactions. At Step 703, the list of inferred users is returned in response to the query of Step 702.

If the multimedia object was uploaded lacking any explicit location information, but location API was able to determine its location through the process as described above, the social networking system 100 at Step 704 searches for social actions at the same location and time. For example, if a user uploads a photo of the Eiffel Tower time stamped at 4 PM, and another checks into the Eiffel Tower at 5 PM, social networking system 100 may determine that they were at the same event, and push remarketing material for objects found in the photo to the second user. In particular embodiments, social networking system 100 determines how close in time and space two actions must be for the users to be considered "at the same place." In particular embodiments, individual advertisers or concept node administrators may set these values.

At Step 705, social networking system 100 pushes remarketing content to the inferred users. In particular embodiments, the remarketing content comprises an advertisement. In particular embodiments, the remarketing content comprises a suggestion to a hub page. In particular embodiments, the content comprises a suggestion to an off-network third-party site 190. In particular embodiments, the content comprises a suggestion to "like" a node on the social network. In particular embodiments, the content comprises an action button that links the brand to the inferred user's profile page. In particular embodiments, the content is a coupon, deal, or other promotion. In particular embodiments, because a user is much more likely to click an advertisement that contains a photo of an event the user attended, the content is the photo in which the concepts were detected. Other types of remarketing content are well-known in the art, and this disclosure contemplates any suitable remarketing content.

Figure 8:
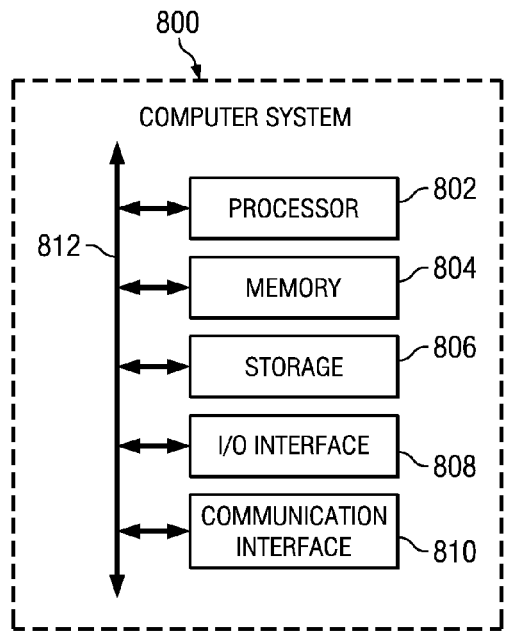
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple datacenters; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 02 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 802 (such as, for example, one or more internal registers or caches), one or more portions of memory 804, one or more portions of storage 806, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 9:
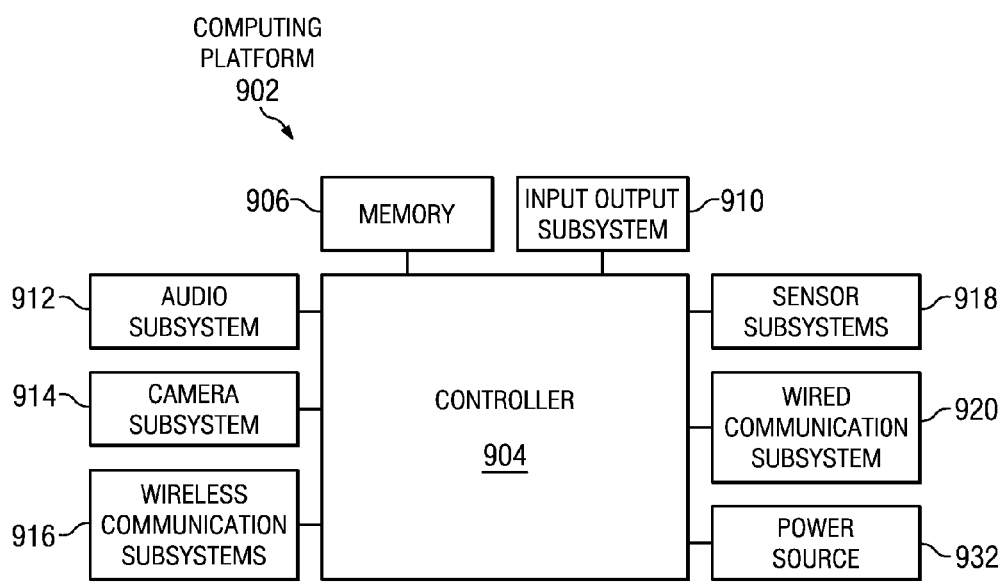
FIG. 9 illustrates an example mobile client device.

The client-side functionality described above can be implemented as a series of instructions stored on a computer-readable storage medium that, when executed, cause a programmable processor to implement the operations described above. While the client device 180 may be implemented in a variety of different hardware and computing systems, FIG. 9 shows a schematic representation of the main components of an example computing platform 902, according to various particular embodiments. Multipoint sensing devices generally include a controller 904 which may comprise a microcontroller or one or more processors configured to execute instructions and to carry out operations associated with a computing platform. In various embodiments, controller 904 may be implemented as a single-chip, multiple chips or other electrical components including one or more integrated circuits and printed circuit boards. Controller 904 may optionally contain a cache memory unit for temporary local storage of instructions, data, or computer addresses. By way of example, using instructions retrieved from memory, controller 904 may control the reception and manipulation of input and output data between components of computing platform 902.

Controller 904 together with a suitable operating system may operate to execute instructions in the form of computer code and produce and use data. The operating system, other computer code (including control client 907 described below) or data may be physically stored within a memory block 906 that is operatively coupled to controller 904. Memory block 906 encompasses one or more storage media and generally provides a place to store computer code (e.g., software or firmware) and data that are used by the computing platform 902. Memory block 906 may also include one or more fixed storage devices in the form of, by way of example, solid-state hard disk drives (HDDs), among other suitable forms of memory coupled bi-directionally to controller 904. Information may also reside on a removable storage medium loaded into or installed in multipoint sensing devices when needed.

Controller 904 is also generally coupled to a variety of interfaces such as graphics control, video interface, input interface, output interface, and storage interface, and network interface, and these interfaces in turn are coupled to the appropriate devices. In certain embodiment, Controller 904 may connected to an input structure 914 and display 916 may be provided together, such an in the case of a touchscreen where a touch sensitive mechanism is provided in conjunction with the display 916. In such embodiments, the user may select or interact with displayed interface elements via the touch sensitive mechanism. In this way, the displayed interface may provide interactive functionality, allowing a user to navigate the displayed interface by touching the display 916.

Electric signals (e.g., analog) may be produced by microphone 910 and fed to earpiece 912. Controller 904 may receive instruction signals from input structure 914 and control the operation of display 916. By way of example, display 916 may incorporate liquid crystal display (LCD), light emitting diode (LED), Interferometric modulator display (IMOD), or any other suitable display technology. Audio signals may be transmitted and received by means of an antenna 917 that may be connected through a radio interface 920 or audio input interface such as microphone 924 to codec 922 configured to process signals under control of controller 904. Additionally, multipoint sensing devices may be powered power source 932.

Computing platform 902 may also include one or more user input devices 934 (other than input structure 914) that are operatively coupled to the controller 904. Generally, input devices 934 are configured to transfer data, commands and responses from the outside world into multipoint sensing devices. By way of example, mobile device may include a keyboard or mouse. Input devices 934 may also include one or more hard buttons.

Display device 916 is generally configured to display a graphical user interface (GUI) that provides an easy to use visual interface between a user of the computing platform 902 and the operating system or application(s) running on the mobile device. Generally, the GUI presents programs, files and operational options with graphical images. During operation, the user may select and activate various graphical images displayed on the display 916 in order to initiate functions and tasks associated therewith.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. Any computer-based system that provides social networking functionality can be used in accordance with the present invention even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a social network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by one or more computer systems, a multimedia object from a first user of an online social network, wherein the first user is represented by a first user node of a social graph associated with the online social network;
   detecting, by one or more computer systems, one or more concepts associated with the multimedia object, the one or more concepts being represented by one or more concept nodes of the social graph, respectively; and
   identifying, by one or more computer systems, one or more second users of the online social network as being exposed to the one or more concepts associated with the multimedia object, each second user being identified based at least in part on one or more social actions associated with the second user with respect to the multimedia object, wherein the one or more second users are represented by one or more second user nodes of the social graph, respectively, each second user node being within a specified degree of separation of the first user node.

2. The method of claim 1, wherein identifying the second users who were exposed to the concept, comprises:
   determining, by one or more computer systems, a physical location that is associated with the multimedia object;
   determining, by one or more computer systems, a time period during which the multimedia object was captured;
   identifying the social actions, wherein the social actions are identified based at least in part on a calculated probability that the social actions occurred both at the physical location and within the time period; and
   identifying, by one or more computer systems, the second users whose respective nodes are associated with the identified social actions.

3. The method of claim 2, wherein determining the physical location comprises querying the social network for one or more locations explicitly associated with the multimedia object.

4. The method of claim 2, wherein determining a physical location comprises:
   applying, by one or more computer systems, one or more object image recognition algorithms to the multimedia object;
   comparing, by one or more computer systems, at least a portion of the multimedia object to a plurality of stored images in a database, each of the plurality of stored images associated with one or more physical locations; and
   based on the comparison, by one or more computer systems, determining the physical location.

5. The method of claim 1, further comprising pushing content associated with one or more of the detected concepts to one or more of the second users.

6. The method claim 5, wherein:
   each of the concepts are associated one or more concept nodes on the social network; and
   the content pushed to the second users is associated with a competitor of an owner or administrator of one or more of the concept nodes.

7. The method of claim 1, wherein the social actions comprise one or more of:
   a check-in to a location;
   an RSVP for an event; or
   a tag in one or more other multimedia objects associated with an event.

8. The method of claim 1, wherein detecting one or more concepts associated with the multimedia object comprises:
   applying, by one or more computer systems, one or more image object recognition algorithms to the multimedia object;
   comparing, by one or more computer systems, at least a portion of the multimedia object to a plurality of stored objects in a database, each of the plurality of stored objects associated with one or more concepts;
   based on the comparison, identifying, by one or more computer systems, one or more concepts associated with the multimedia object; and
   attaching, by one or more computer systems, meta-data identifying one or more of the concepts to the multimedia object.

9. The method of claim 8, wherein:
   the multimedia object comprises an image; and
   the plurality of stored objects comprises a plurality of stored images.

10. The method of claim 8, wherein the multimedia object comprises a video and comparing at least a portion of the multimedia object comprises:

extracting, by one or more computer systems, one or more frames from the video; and comparing, by one or more computer systems, one or more of the extracted frames to the plurality of stored objects, wherein the plurality of stored objects comprises a plurality of stored images.

11. The method of claim 1, wherein the multimedia object comprises a video and detecting one or more concepts comprises:

extracting, by one or more computer systems, one or more audio waveforms from the video; and comparing, by one or more computer systems, one or more of the extracted waveforms to a plurality of stored objects in a database, each of the plurality of stored objects associated with one or more concepts, wherein the plurality of stored objects comprises a plurality of stored audio waveforms;

based on the comparison, by one or more computer systems, identifying one or more concepts associated with the multimedia object; and attaching, by one or more computer systems, meta-data identifying one or more of the concepts to the multimedia object.

12. The method of claim 1, wherein each concept node corresponds to a brand, product, or company.

13. The method of claim 1, further comprising:

accessing the social graph, wherein the social graph comprises a plurality of nodes and a plurality of edges connecting the nodes, each connection between two nodes establishing a single degree of separation between the two nodes, wherein the plurality of nodes comprises:

the first user node;

a plurality of second user nodes representing a plurality of second users, respectively; and a plurality of concept nodes representing a plurality of concept nodes, respectively.

14. The method of claim 1, wherein the specified degree of separation is one, two, three, or all.

15. One or more non-transitory computer-readable storage media embodying software that is operable when executed to:

receive a multimedia object from a first user of an online social network, wherein the first user is represented by a first user node of a social graph associated with the online social network;

detect one or more concepts associated with the multimedia object, the one or more concepts being represented by one or more concept nodes of the social graph, respectively; and identify one or more second users of the online social network as being exposed to the one or more concepts associated with the multimedia object, each second user being identified based at least in part on one or more social actions associated with the second user with respect to the multimedia object, wherein the one or more second users are represented by one or more second user nodes of the social graph, respectively, each second user node being within a specified degree of separation of the first user node.

16. The media of claim 15, wherein the software is further operable when identifying the second users who were exposed to the concept, to:

determine a physical location that is associated with the multimedia object;

determine a time period during which the multimedia object was captured;

identify the social actions, wherein the social actions are identified based at least in part on a calculated probability that the social actions occurred both at the physical location and within the time period; and identify the second users whose respective nodes are associated with the identified social actions.

17. The media of claim 15, wherein the instructions are further operable when executed to push content associated with one or more of the detected concepts to one or more of the second users.

18. The media of claim 17, wherein:

each of the concepts are associated with one or more concept nodes on the social network; and the content pushed to the second users is associated with a competitor of an owner or administrator of one or more of the concept nodes.

19. The media of claim 15, wherein the social actions comprise one or more of:

a check-in to a location;

an RSVP for an event; or a tag in one or more other multimedia objects associated with an event.

20. A system comprising: one or more processors; and a memory coupled to the processors comprising instructions executable by the processors, the processors being operable when executing the instructions to:

receive a multimedia object from a first user of an online social network, wherein the first user is represented by a first user node of a social graph associated with the online social network;

detect one or more concepts associated with the multimedia object, the one or more concepts being represented by one or more concept nodes of the social graph, respectively; and identify one or more second users of the online social network as being exposed to the one or more concepts associated with the multimedia object, each second user being identified based at least in part on one or more social actions associated with the second user with respect to the multimedia object, wherein the one or more second users are represented by one or more second user nodes of the social graph, respectively, each second user node being within a specified degree of separation of the first user node.

* * * * *